A. SUNDH.
FLUID CLUTCH.
APPLICATION FILED MAR. 28, 1917.

1,372,984.

Patented Mar. 29, 1921.
3 SHEETS—SHEET 1.

August Sundh
Inventor

By his Attorney
James G. Bethell.

A. SUNDH.
FLUID CLUTCH.
APPLICATION FILED MAR. 28, 1917.

1,372,984.

Patented Mar. 29, 1921.
3 SHEETS—SHEET 2.

August Sundh,
Inventor

By his Attorney James G. Porthill.

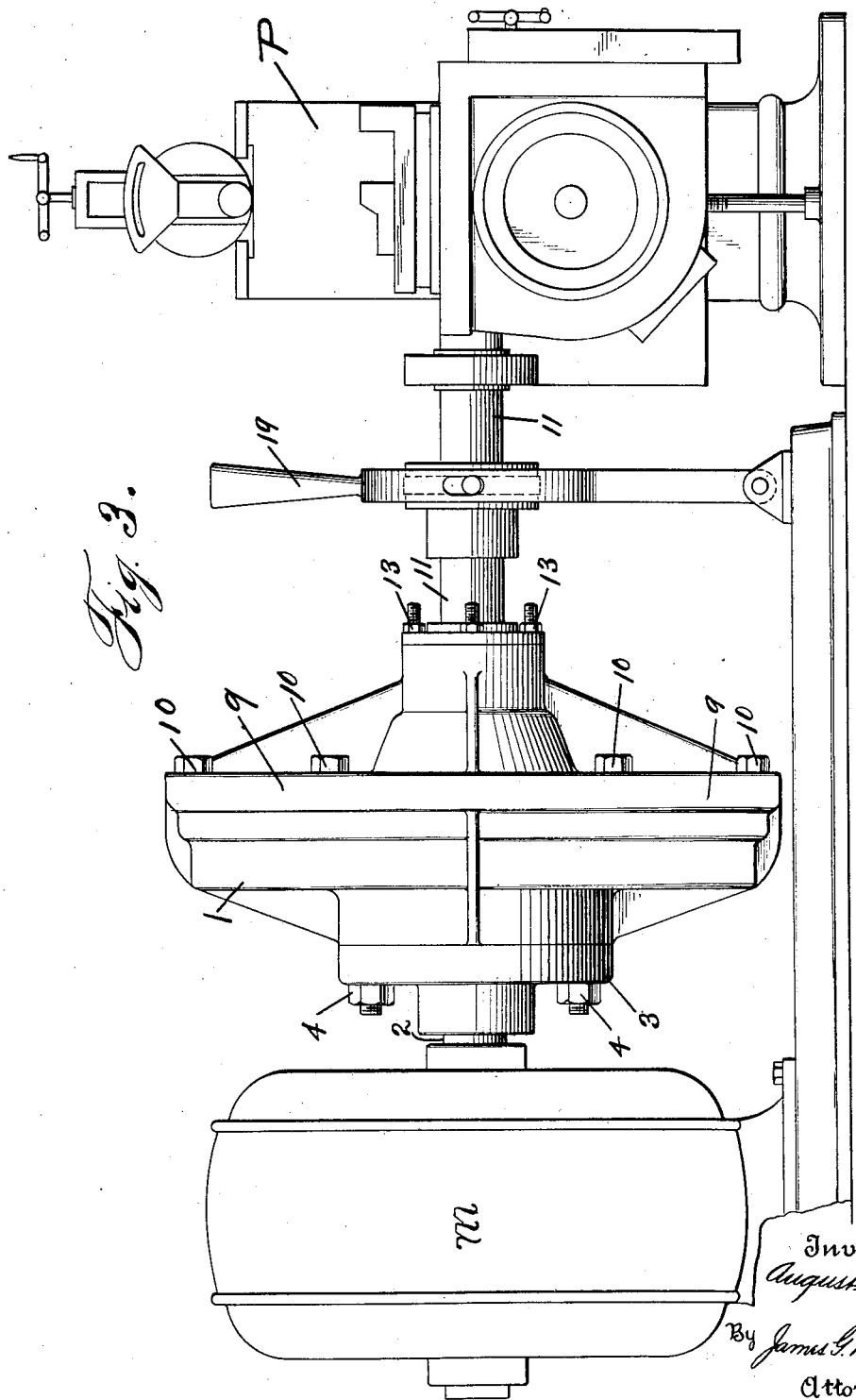

UNITED STATES PATENT OFFICE.

AUGUST SUNDH, OF HASTINGS-UPON-HUDSON, NEW YORK.

FLUID-CLUTCH.

1,372,984.   Specification of Letters Patent.   Patented Mar. 29, 1921.

Application filed March 28, 1917. Serial No. 158,085.

*To all whom it may concern:*

Be it known that I, AUGUST SUNDH, a citizen of the United States, and resident of Hastings-upon-Hudson, county of Westchester, State of New York, have invented certain new and useful Improvements in Fluid-Clutches, of which the following is a specification.

My invention relates to an improvement in fluid clutches, and more particularly the invention involves clutching two members together to be driven at the same speed or at variable speeds, by means of actuating fluid therein. In my invention, one member is driven by any suitable power and the other member is driven by the rotating member, and the power is transmitted through the members to drive them at the same speed, or at variable speeds, the two members as a whole constituting the clutch.

There have been many attempts to make variable speed hydraulic clutches, but the main objections have been that, the two members have not been entirely disconnected when it is desired to have one member standing still and the other running, and the mechanism is operating to circulate the fluid except when the two members are running at the same speed. This means loss of efficiency, wear on the mechanism, heating of the fluid, leakage, and no separation of the members at any time.

In my improved clutch, I have overcome these objections. One member may be driven at full speed and at the same time the other member maintained at rest, the members being free from each other, centrifugal force aiding in separating them, and no fluid is actuated under such conditions. When it is desired to drive the members at variable speed relative to each other, the mechanism will be operated accordingly, and a quantity of fluid will be actuated in proportion to the speed desired.

The pressure on the fluid, of course, will be in proportion to the load to be driven. When it is desired to run the two members at the same speed, their mechanical connection will be held at rest, and the fluid will be held at rest, under pressure, this pressure being in proportion to the load to be driven. Therefore, it will be seen that, the only time the mechanism is actuating the fluid is when it is desired to drive the two members at variable speed. It will be understood also that, at that time, the operation of the mechanism and the quantity of fluid actuated thereby is in proportion to the desired speed.

Figure 1:
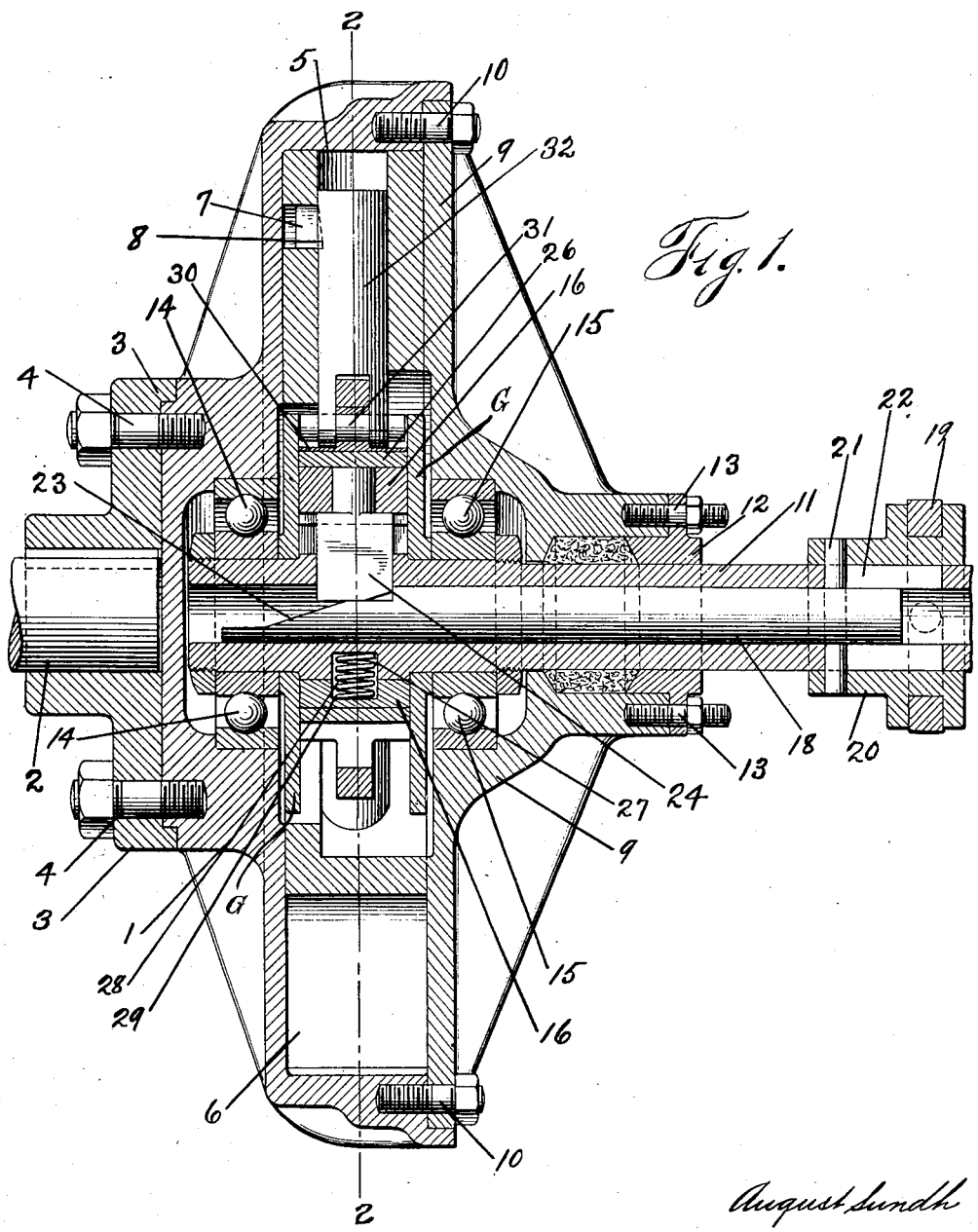
Figure 2:
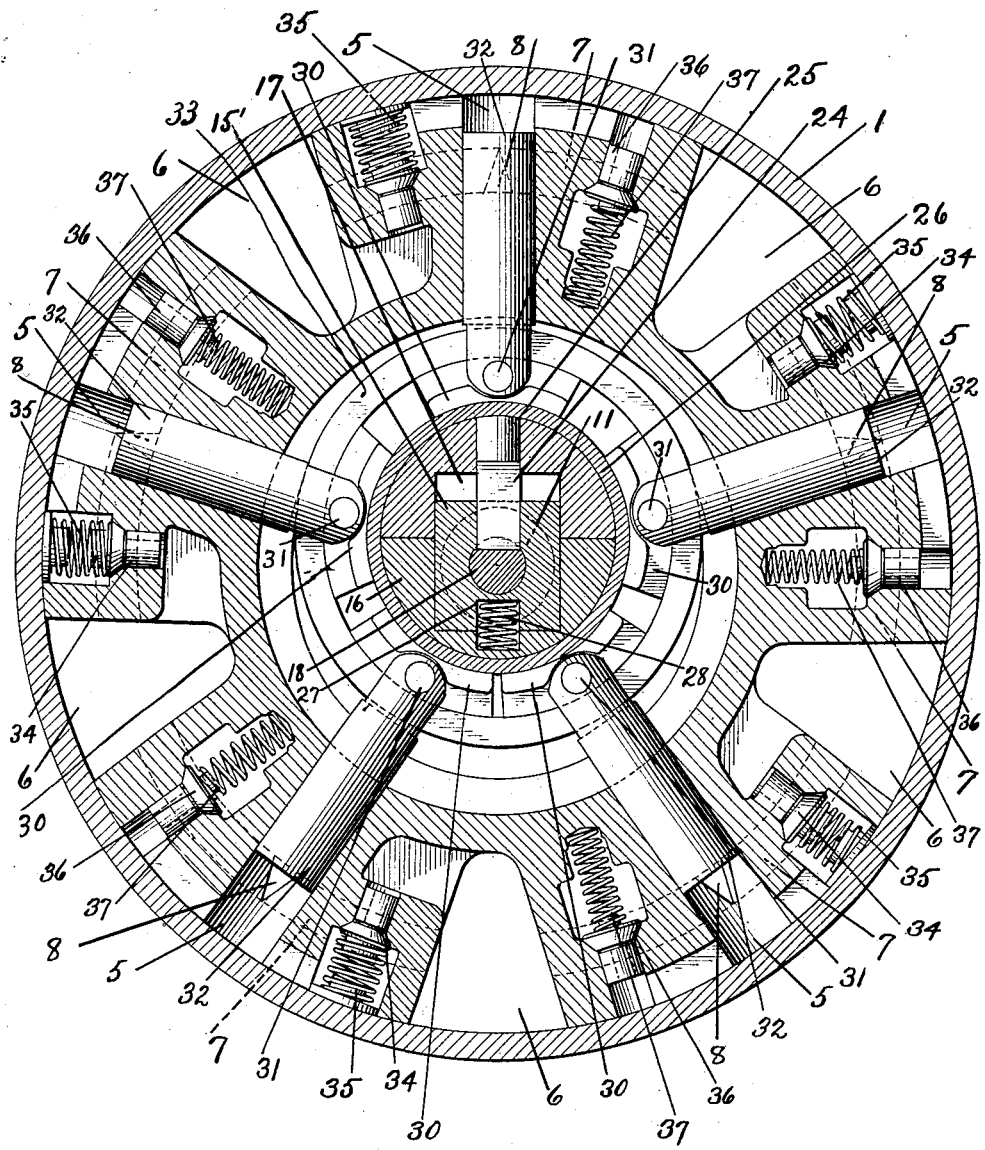

Referring to the drawings, accompanying this application, Figure 1 is a sectional elevation of my apparatus; Fig. 2 is a sectional view taken at right angles to Fig. 1 on line 2—2 of Fig. 1; and Fig. 3 is a general arrangement view showing my clutch connecting an electric motor to a planer.

Throughout the drawings, like characters of reference designate like parts.

Referring to the drawings in detail: A casing designated 1, is adapted to be rotated by the armature shaft 2 of an electric motor M, a plate 3, secured to the left hand side of the casing 1, by studs 4, forming a connection between the armature shaft 2 and the casing 1. Within the casing, and formed integral therewith, if desired, are five cylinders 5, and five compartments or chambers 6, communicating with each other by ports 7. V-shaped or triangular ports 8 are cut through the walls of each of the cylinders 5, these ports communicating with the passages 7 already mentioned. A plate 9 is secured by means of studs 10 to the right hand side of the casing 1, as viewed in Fig. 1. Extending from the outside of the casing 1, through a stuffing box 12 fastened to the plate 9 by studs 13, to the interior of the casing, is a hollow shaft 11, this shaft 11 being journaled in the casing at 14 and 15. The other end of this shaft is connected to the planer P as shown in Fig. 3. A squared portion 15' is provided on the shaft 11 at a point between the bearings 14 and 15 just mentioned. This squared portion carries a member 16, this member being in two sections, and provided with an opening 17, so that it may be moved on the squared portion 15' radially to the shaft 11. A rod 18 is carried within the hollow shaft 11 and is adapted to be moved longitudinally thereof by the lever 19, to which it is connected by means of a collar 20 engaging a pin 21, the latter extending through the rod 18, the collar and pin having movement longitudinally of the shaft 11, the pin 21 moving in a slot 22 in the said shaft, the ends of this slot limiting the movement of the pin and therefore the rod 18 in both directions. Near the left hand end of the rod 18, as viewed in Fig. 1, I have provided an inclined face 23. This face engages a member 24, which extends through the wall of the hollow shaft 11, its other end entering an orifice 25 cut in one of the sections of the member 16, and having a driving fit in said orifice. A collar 26 is shrunk on the member 16 holding the same firmly in place. At the opposite side of the shaft 11 to that at which the member 24 enters, I provide an orifice 27 for the reception of a coil spring 28, the other end of the latter seating in an orifice 29 in the member 16. Surrounding the collar 26 are shoes 30, five in all, shaped to conform to the contour of the ring 26. Surrounding the shoes 30 is a ring or collar 33, the shoes 30 and ring 33 being constructed to permit a slight play between the shoes and the collar 26, so that when the eccentric mechanism is central, the shoes may be drawn away from the face of the collar 26. Attached to the shoes 30 by pins 31, are pistons 32, these pistons entering the cylinders 5.

From the description thus far given, it will be seen that, movement of the rod 18 to the left forces the member 24 upwardly, this member sliding in the opening in the wall of the hollow shaft 11, and carrying with it the member 16, and the collar or ring 26, which may be referred to as eccentric mechanism, being guided by the guiding members G. The ring 33 and shoes 30 will have been moved also and if the casing 1 be rotated the pistons 32 will be caused to reciprocate in their respective cylinders. As the rod 18 was moved to this position, the spring 28 was compressed, and when the rod 18 is moved in the opposite direction, the action of this spring will cause the parts to resume neutral position, or at least to be moved toward neutral position to an extent depending upon the amount of movement of the rod 18.

Valves 34 seated by springs 35 control passages from the chambers 6 to the cylinders 5 at the top of the latter, these valves being provided for the purpose of admitting fluid to the cylinders 5 when the pistons 32 are moving inwardly, to prevent the same working on a vacuum. Valve mechanism 36 controlling passages from the cylinders 5 to the chambers 6 are provided for the purpose of relieving excess pressure in the fluid should the rod 18 be moved from neutral to full "on" position instantaneously. These valves are seated by springs 37.

Assuming the electric motor M is rotating constantly and therefore the casing 1: The lever 19 I will assume is in central position, as shown in Fig. 3, the rod 18 being moved to its extreme right hand position, and the eccentric mechanism in central position, concentric with the shaft 11. With the parts in this position, the collar 33 and the shoes 30 will have been moved into a position concentric with the shaft 11. At this time the fluid within the casing is not being circulated, and the shaft 11 is standing still. The centrifugal force due to the rotation of the casing 1 will draw the fluid within the casing to its outer rim, eliminating any leakage of fluid from within the casing out by the stuffing box 12; and the shoes 30 and collar 33 will be also drawn away from driving engagement with the collar 26, thus leaving the shaft 11 and its connected mechanism, entirely free from engagement with the rotating mechanism. At this time, therefore, there is absolutely no driving action on the shaft 11.

Assuming now that the rod 18 be moved to the left by manipulation of the lever 19. This at once actuates the eccentric mechanism, carrying the shoes 30 and the ring 33 to an eccentric position relative to the shaft 11. Now as the casing continues to rotate, the pistons 32 will reciprocate in their respective cylinders 5 and the fluid within the casing will be placed under pressure to a degree depending upon the extent of movement of the rod 18 and the load to be driven. I will assume first of all that the rod 18 has been moved to the position shown in Fig. 1, which is full clutching position. As each piston moves outwardly in its cylinder, it forces some of the fluid out through the ports 8, this amount gradually decreasing as the piston approaches the apex of the port, and until it reaches the same, after which there is no more escape of the fluid and it is rapidly raised to the extreme or maximum pressure. The fluid is now locked in the casing, and the shoes 30 will be held against the collar 26 by the pressure in the fluid, to drive the shaft 11 at the same speed as the casing 1. If the rod 18 had been moved instantaneously from neutral to the present assumed position, the pressure of the fluid might have been excessive, due to the inertia of the shaft 11 and its load, which would produce a shock in the mechanism, and to take care of this I have provided the valves 36. The excess pressure acting on the valves will compress their springs 37 and allow the fluid to escape from the cylinders until the inertia of the shaft 11 and its load has been overcome and the pressure lowered to its normal maximum degree. Also should there be a tendency for a vacuum to form at the ends of the pistons on their inward stroke, the valves 34 will lift and allow the fluid to enter the cylinders.

I will now assume that the rod 18 is moved to a position where the eccentric mechanism will cause the pistons to reciprocate to close off the V-shaped ports 8 to an extent necessary to actuate a desired quantity of fluid to drive the shaft 11 and its load at a desired speed. The pressure on the fluid will be in proportion to the load on the shaft 11, and the speed at which the shaft 11 will be driven is in proportion to the quantity of fluid actuated, and as the quantity of fluid actuated at this time is less than when the eccentric is in full stroke position, the shaft 11 together with its load will rotate at a lower speed than the casing 1. It will be observed that by having the V-shaped or triangular ports 8 arranged with their apices toward the outer end of the cylinders and their bases toward the lower portion that a nicety of adjustment of the retarding effect may be secured, as the outer edge of the pistons may close to any desired extent these ports. These ports gradually taper, as will be seen, toward their outer edge and therefore more and more retarding action takes place as the pistons close more and more of the port opening. These ports are also of the elongated nature in the direction of the length of the cylinder. This allows some latitude for adjustment of the stroke of the pistons before the ports are completely closed which is a desirable feature for accurately adjusting the speed of the driven member. As the quantity of fluid actuated and the pressure on the fluid due to the load on the shaft 11, determines the variation in speed of the two members of the clutch, it will be seen that by adjusting the eccentric, any desired variation in relative speed of the two clutch members may be readily obtained.

It is to be understood that the application of this clutch is not limited to that shown and described in the present application, the clutch being adapted for use in any situation where clutches are now in use. It is to be understood also, that I do not desire to be limited to the precise details of construction and arrangement of parts herein shown and described, for I appreciate that others skilled in this art, might make various changes therein without departing from the spirit and scope of my invention.

What I claim as new, and desire to secure by Letters Patent of the United States is:—

1. In clutch mechanism, the combination of two separate members, fluid actuating mechanism in one of said members, and means on the second member to cause the fluid actuating mechanism to actuate varying quantities of fluid in one of said members to cause the second member to move at varying speeds relative to the first member, said means including a single transversely shiftable eccentric.

2. In clutch mechanism, the combination of two separate members, fluid actuating mechanism in one of said members, a fluid, and means on the second member to cause the fluid actuating mechanism to operate and cause the second member to move, the two members and the mechanism carried thereby being so disposed as to be maintained entirely separate from each other when the means on the second member is in inoperative position.

3. In clutch mechanism, the combination of two separate members, a plurality of cylinders in one of said members, pistons in said cylinders for compressing the fluid, a fluid, and wedge like means carried by the second member coöperating with transversely movable means engaging the pistons to regulate the stroke of said pistons and to cause said pistons to actuate the fluid in varying quantities to move the second member at varying speeds.

4. In clutch mechanism, the combination of two separate members, a plurality of cylinders in one of said members, pistons in said cylinders, a fluid, means on the second member to cause the pistons to place the fluid under pressure to cause the second member to move, and triangular ports in said cylinders coöperating with said means on the second member adapted to be closed by said pistons to regulate the pressure to which the fluid is raised.

5. In clutch mechanism, the combination of two separate members, a plurality of cylinders in one of said members, pistons in said cylinders, a fluid, means on the second member to vary the stroke of the pistons to place the fluid under adjustable pressure to cause the second member to move, and means for limiting the pressure to which the fluid may be raised.

6. In clutch mechanism, the combination of two separate members, a plurality of cylinders in one of said members, pistons in said cylinders, a fluid, means on the second member to vary the stroke of the pistons to place the fluid under pressure to move the second member, and valve mechanism communicating with said cylinders to limit the pressure to which the fluid may be raised.

7. In clutch mechanism, the combination of two separate members, cylinders in one of said members, pistons in said cylinders, a fluid, eccentric mechanism carried by the second member, guiding means therefor on each side of said eccentric, and means for adjusting said eccentric mechanism to cause the same to actuate the pistons to place the fluid under pressure and cause the second member to move.

8. In clutch mechanism, the combination of two separate members, cylinders in one of said members, pistons therein, mechanism carried by the other member for causing the pistons to be operated in the said cylinders, the cylinders being provided with openings having their greatest dimension longitudinally of the cylinders for obtaining a speed regulation between the two members.

9. In clutch mechanism, the combination of two separate members, cylinders and pistons therefor in one of said members, eccentric mechanism carried by the other member, means intermediate the eccentric mechanism and the pistons for establishing an operative connection between the eccentric mechanism and the pistons, said means being constructed so as to be withdrawn by centrifugal force out of operative relation with respect to the eccentric mechanism, whereby the said eccentric mechanism and the member carrying the same will be entirely free from the other member, the pistons carried thereby and the said means intermediate said pistons and said eccentric mechanism.

10. In clutch mechanism, the combination of two separate members, cylinders in one of said members, a fluid, pistons in said cylinders adapted to place said fluid under pressure to cause the second member, which comprises a hollow shaft, to move, eccentric mechanism carried on the second member for actuating the said pistons, and a rod having a slot and pin connection with said hollow shaft for adjusting said eccentric.

11. In clutch mechanism, the combination of two separate members, cylinders in one of said members, a fluid, pistons in said cylinders adapted to place said fluid under pressure to cause the second member, which comprises a hollow shaft, to move, eccentric mechanism carried on the second member for actuating said pistons, and a rod within the hollow shaft for adjusting said eccentric mechanism, said rod having an inclined surface engaging said eccentric.

12. In clutch mechanism, the combination of two separate members, cylinders in one of said members, a fluid, pistons in said cylinders adapted to place said fluid under pressure to cause the second member, which comprises a hollow shaft, to move, eccentric mechanism comprising a member extending through the wall of said hollow shaft, for actuating said pistons, and adjustable means within the hollow shaft for actuating said eccentric.

13. In clutch mechanism, the combination of two separate members, cylinders in one of said members, a fluid, pistons in said cylinders adapted to place said fluid under pressure to cause the second member to move, eccentric mechanism carried on the second member for actuating said pistons, said mechanism comprising a sectional member movable radially of the second member and a member attached thereto and extending into the second member, and means adapted to be manually operated for adjusting the eccentric mechanism to eccentric position.

14. In clutch mechanism, the combination of two separate members, fluid actuating mechanism in one of said members, means carried by the second member to actuate said fluid actuating mechanism to move the second member with the first member, the two members being constructed to be maintained entirely free from each other by centrifugal force, with one member moving and the other at rest.

15. In clutch mechanism the combination of two separate members, cylinders in one of said members, pistons in said cylinders, a fluid, eccentric mechanism carried by the second member, guiding means therefor to keep said eccentric from contact with said first mentioned member, and means for adjusting said eccentric mechanism to cause the same to actuate the pistons to place the fluid under pressure and cause the second member to move.

In testimony whereof, I have signed my name to this specification.

AUGUST SUNDH.